(12) United States Patent
Kim

(10) Patent No.: US 10,083,390 B2
(45) Date of Patent: Sep. 25, 2018

(54) ELECTRONIC SHELF LABEL

(71) Applicant: LG Innotek Co., Ltd., Seoul (KR)

(72) Inventor: Dae Hun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/524,099

(22) PCT Filed: Nov. 3, 2015

(86) PCT No.: PCT/KR2015/011706
§ 371 (c)(1),
(2) Date: May 3, 2017

(87) PCT Pub. No.: WO2016/072703
PCT Pub. Date: May 12, 2016

(65) Prior Publication Data
US 2017/0330064 A1  Nov. 16, 2017

(30) Foreign Application Priority Data

Nov. 3, 2014 (KR) .................. 10-2014-0151593

(51) Int. Cl.
*G06F 17/00* (2006.01)
*G06K 19/077* (2006.01)
(Continued)

(52) U.S. Cl.
CPC ... *G06K 19/0775* (2013.01); *G06K 19/07767* (2013.01); *G06K 2017/0051* (2013.01); *G06Q 30/0601* (2013.01); *H04L 69/14* (2013.01)

(58) Field of Classification Search
CPC ......... G06K 19/0775; G06K 19/07767; G06K 2017/0051; G06C 30/0601;
(Continued)

(56) References Cited

U.S. PATENT DOCUMENTS 5,604,923 A * 2/1997 Wilkus ............... G06K 17/0022
455/226.4
7,210,623 B2 * 5/2007 Capurso .................. G09F 3/204
235/375

(Continued)

FOREIGN PATENT DOCUMENTS

GB      2419217 A      4/2006
KR   20100048205 A     5/2010
(Continued)

OTHER PUBLICATIONS

International Search Report in International Application No. PCT/KR2015/011706, filed Nov. 3, 2015.
(Continued)

*Primary Examiner* — Claude J Brown
(74) *Attorney, Agent, or Firm* — Saliwanchik, Lloyd & Eisenschenk

(57) ABSTRACT

According to an embodiment of the present invention, an electronic price indicator comprises: a base substrate and five mounting units formed on the base substrate. A first antenna for receiving information from a server is mounted on the first mounting unit. A first communication module connected to the first antenna is mounted on the second mounting unit. A second antenna for receiving a management signal from a management terminal is mounted on the third mounting unit. A second communication module connected to the second antenna is selectively mounted on the fourth mounting unit. The fifth mounting unit is selectively and directly connected to any one of the second antenna and the second communication module, and provided with a low frequency (LF) circuit mounted thereon to transmit an interrupt in accordance with the management signal to the first communication module.

16 Claims, 12 Drawing Sheets

(51) Int. Cl.
*G06Q 30/06* (2012.01)
*H04L 29/06* (2006.01)
*G06K 17/00* (2006.01)

(58) Field of Classification Search
CPC ........... G09G 2380/04; G09G 2370/16; G09G 2330/02; G06F 3/208; H04L 12/5692; H04L 69/14
USPC .......................................................... 235/375
See application file for complete search history.

(56) References Cited

U.S. PATENT DOCUMENTS

| | | | |
|---|---|---|---|
| 7,283,036 | B2 | 10/2007 | Chen |
| 7,436,285 | B1* | 10/2008 | Roquemore, III ........................... G06K 19/0723 340/10.1 |
| 2001/0028300 | A1* | 10/2001 | Matsushita ............. G06Q 30/06 340/5.91 |
| 2005/0218208 | A1 | 10/2005 | Sugie et al. |
| 2009/0275302 | A1* | 11/2009 | Huston ................... H04B 1/24 455/231 |
| 2010/0225444 | A1* | 9/2010 | Nobutsugu ............. G06F 3/147 340/5.91 |
| 2011/0102155 | A1 | 5/2011 | Choi et al. |
| 2011/0240731 | A1* | 10/2011 | Lee ........................ G06Q 30/06 235/375 |
| 2012/0055985 | A1* | 3/2012 | Allen ..................... G06Q 10/08 235/375 |
| 2013/0026854 | A1 | 1/2013 | Wang et al. |
| 2013/0048721 | A1* | 2/2013 | Rasband ........... G06F 17/30879 235/383 |
| 2013/0240616 | A1* | 9/2013 | Huang ..................... G09G 5/22 235/375 |
| 2013/0339151 | A1 | 12/2013 | Bottine et al. |
| 2014/0177604 | A1* | 6/2014 | Lee ................... H04W 52/0212 370/336 |
| 2014/0256372 | A1 | 9/2014 | Karhuketo et al. |
| 2014/0292107 | A1 | 10/2014 | Cho et al. |
| 2014/0353368 | A1* | 12/2014 | Connolly ................ G06F 3/147 235/375 |
| 2016/0156701 | A1* | 6/2016 | Robin ................... G06Q 30/02 709/219 |

FOREIGN PATENT DOCUMENTS

| | | |
|---|---|---|
| KR | 20110045963 A | 5/2011 |
| KR | 20120028177 A | 3/2012 |
| KR | 20140056797 A | 5/2014 |

OTHER PUBLICATIONS

Supplementary European Search Report dated Oct. 11, 2017 in European Application No. 15856559.8.

* cited by examiner

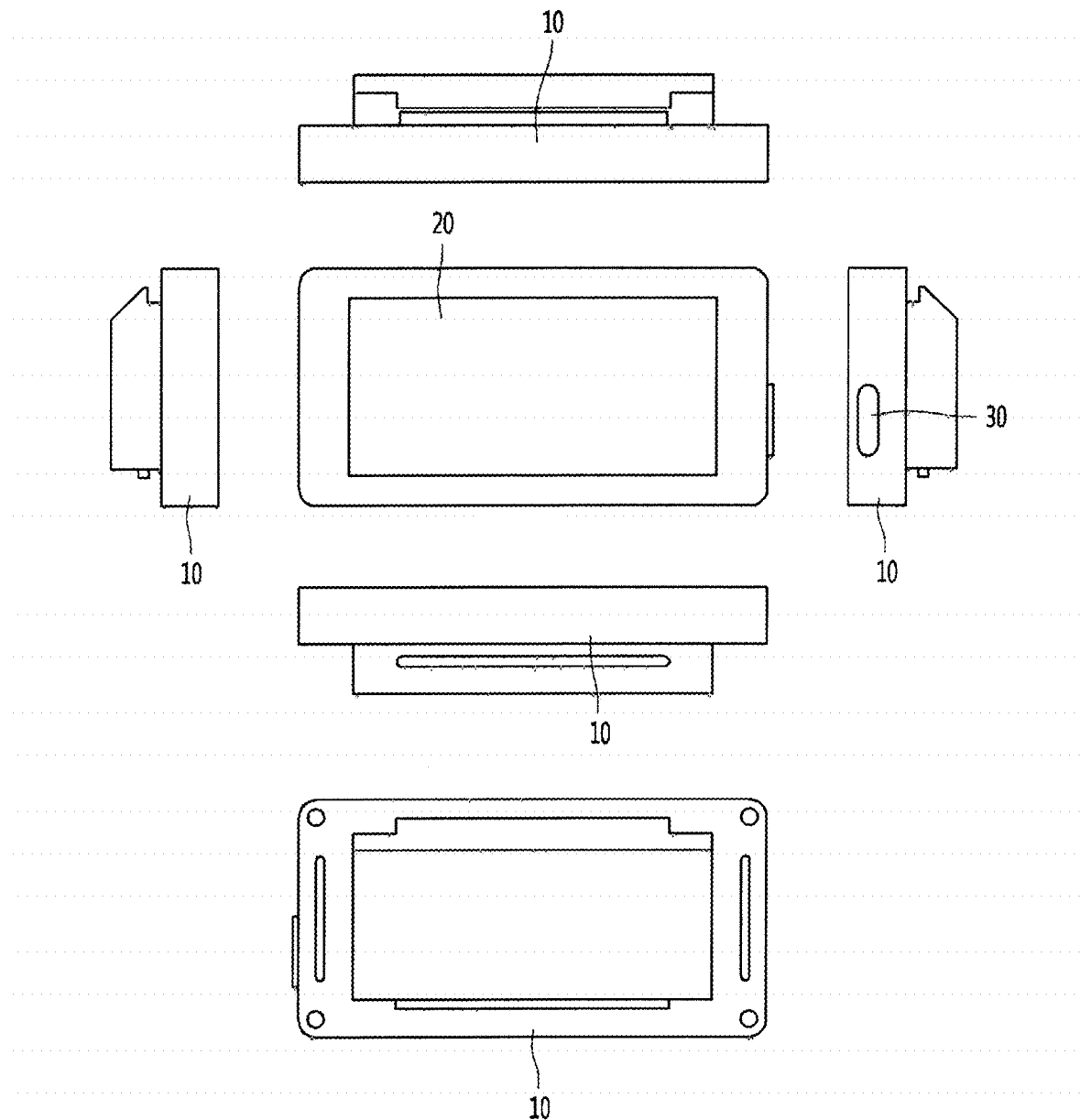
[Fig. 1]   Prior Art

[Fig. 2]
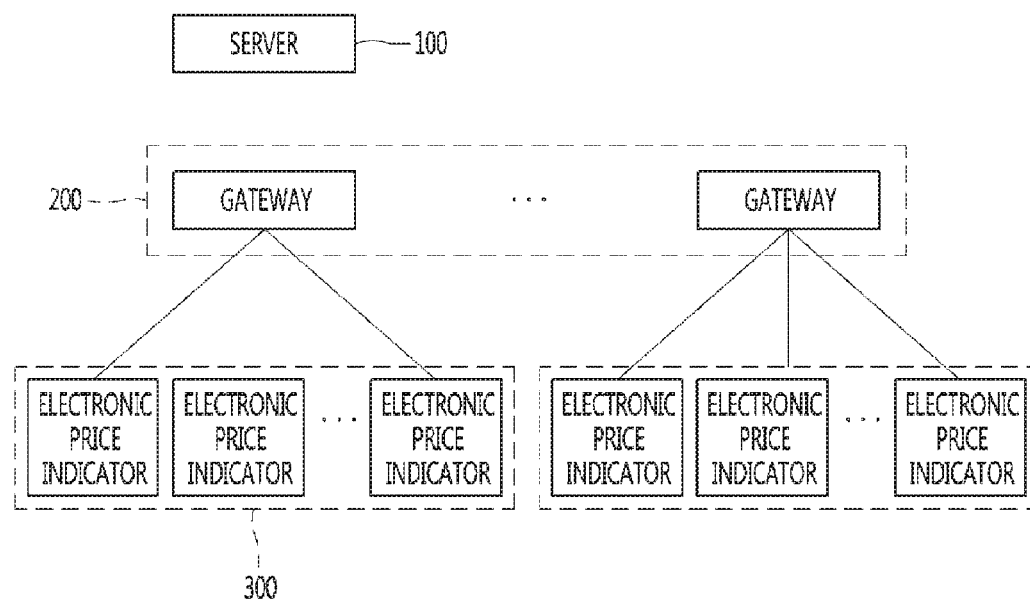
[Fig. 3]
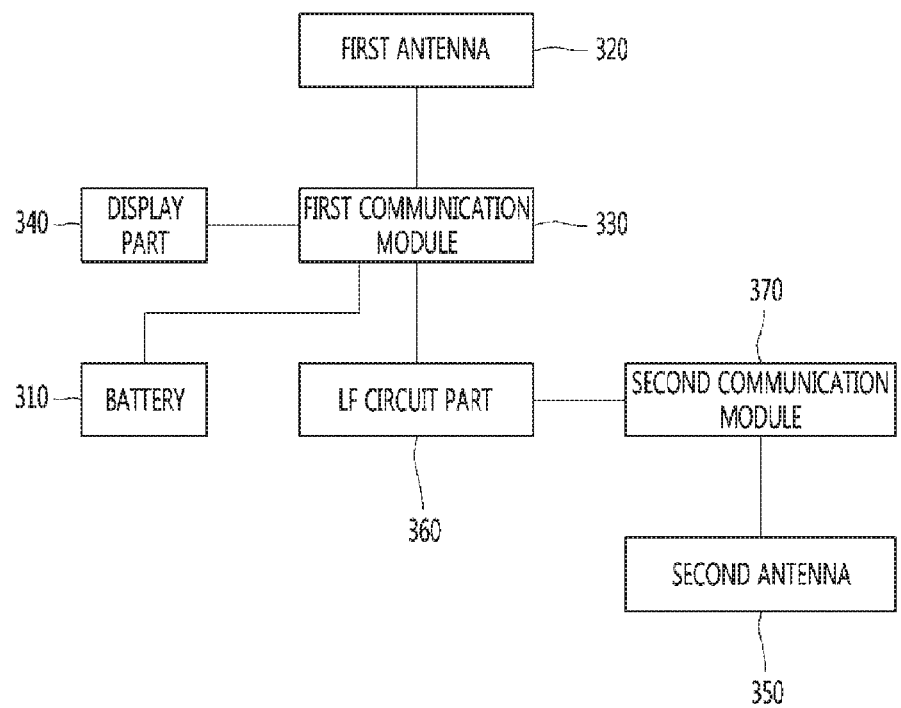

[Fig. 4]
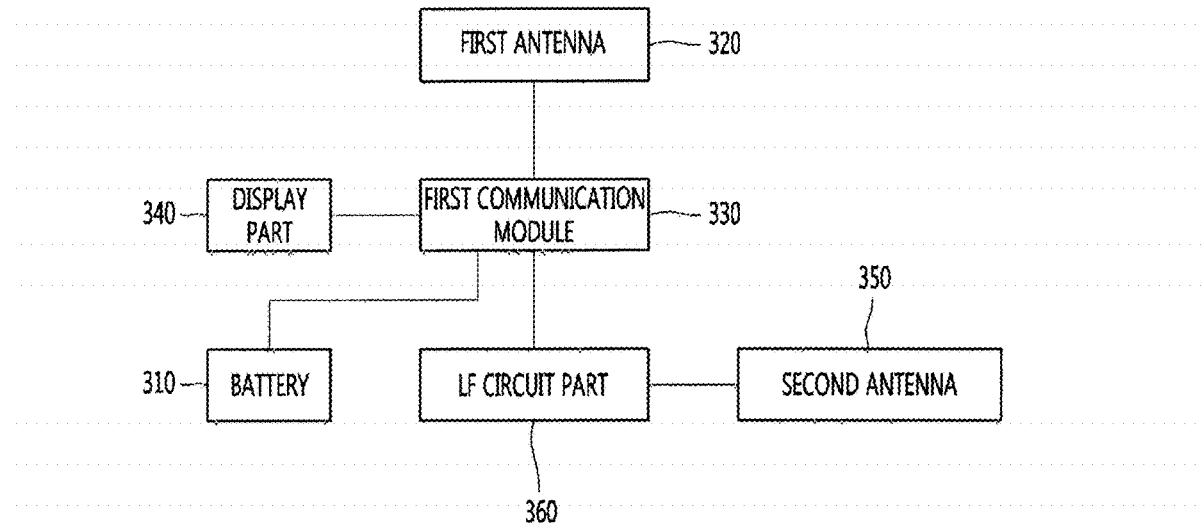
[Fig. 5]
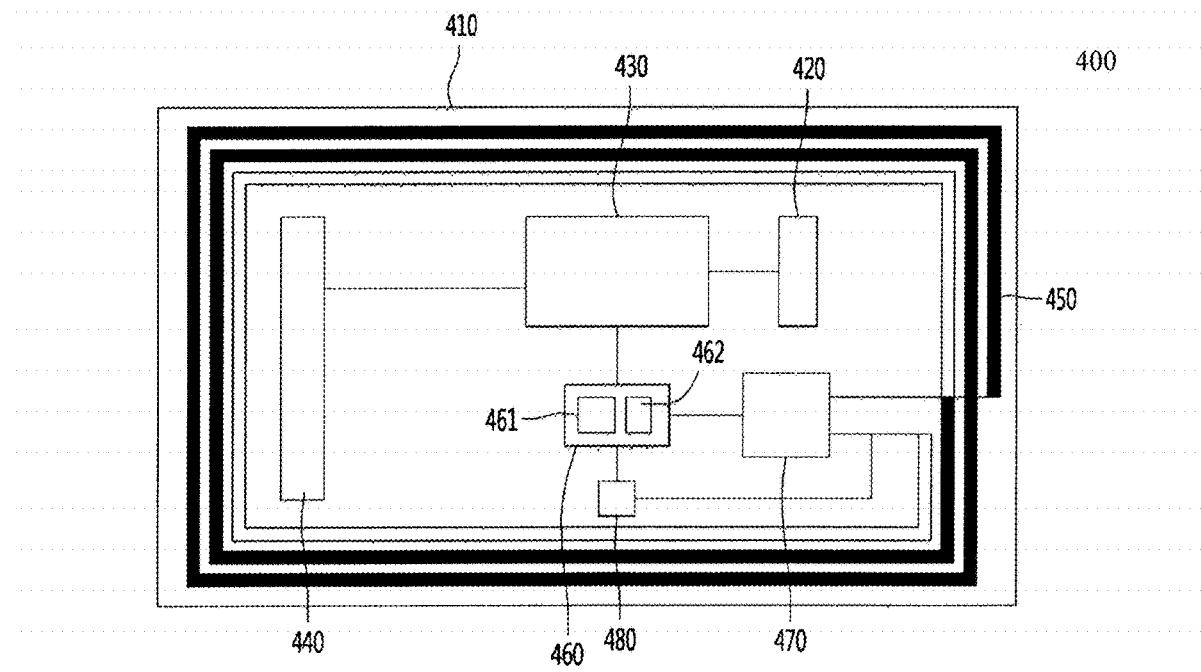

[Fig. 6]
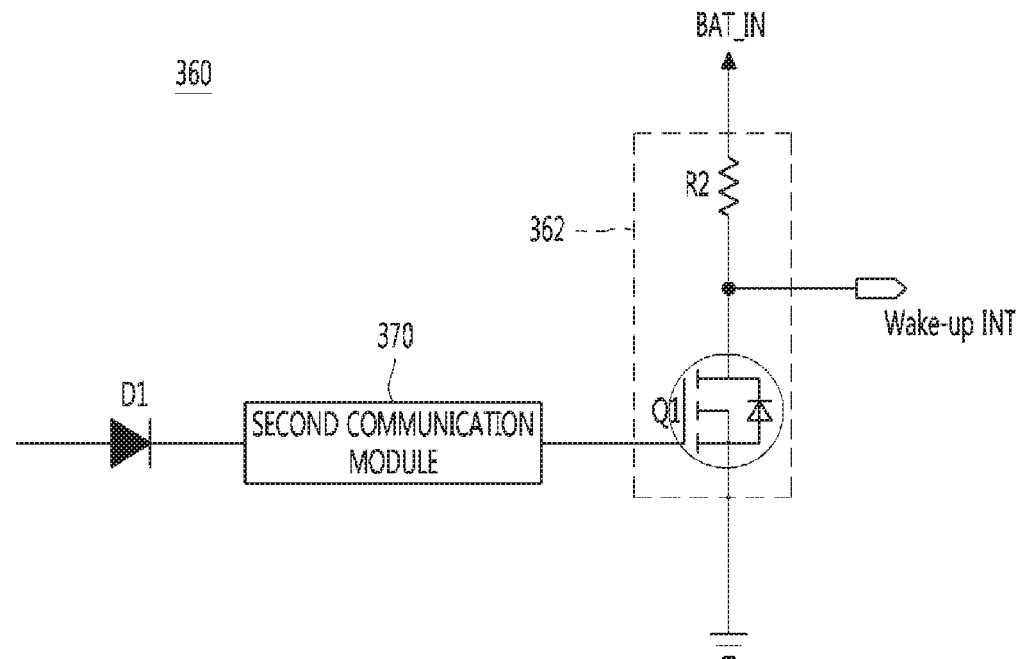
[Fig. 7]
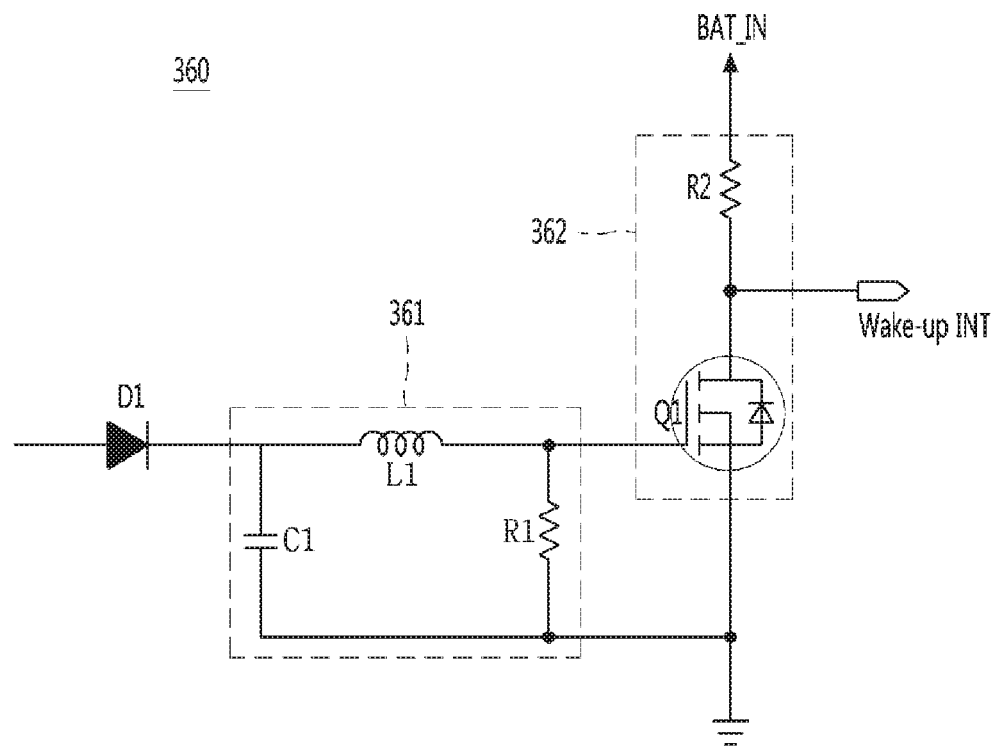

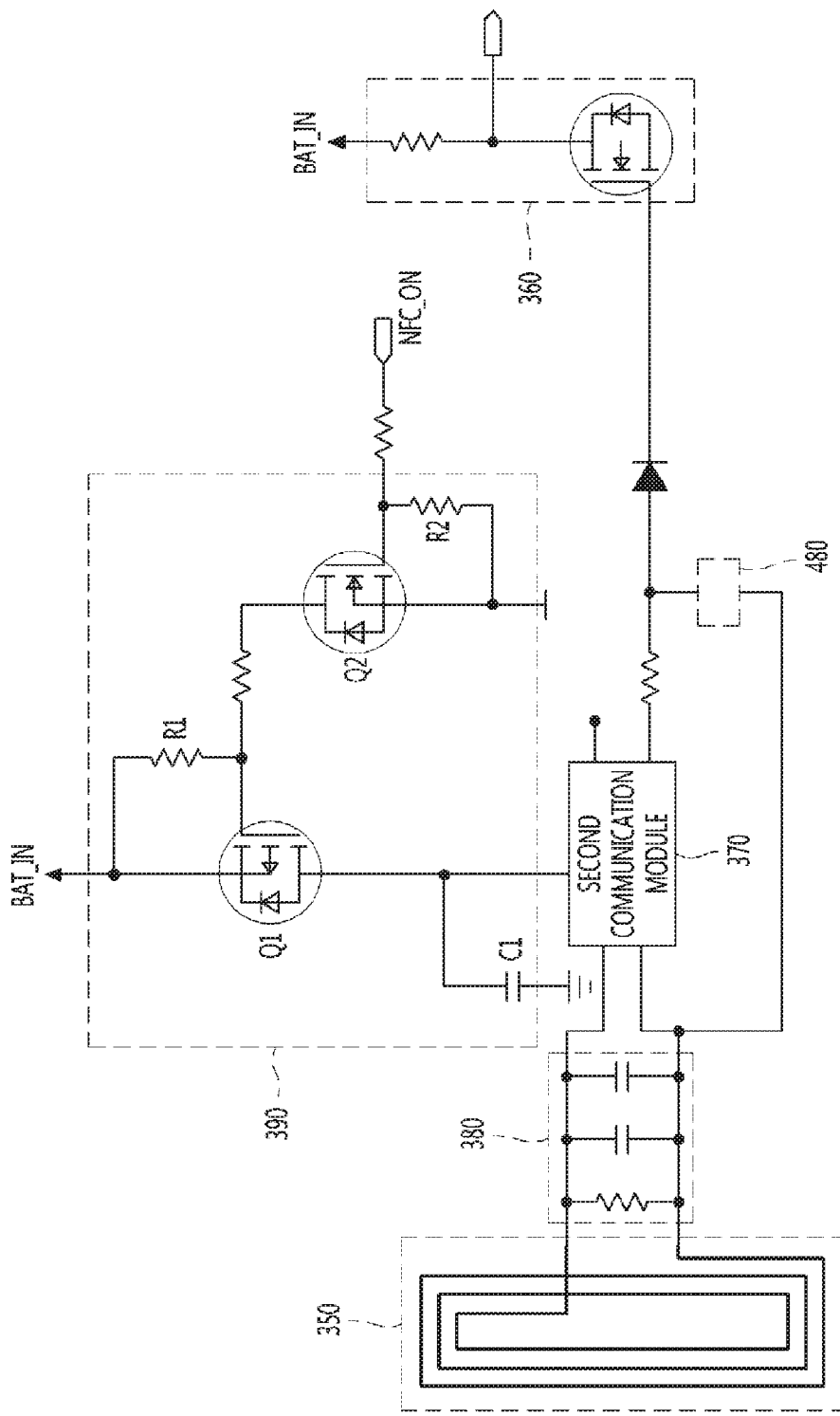
[Fig. 8]

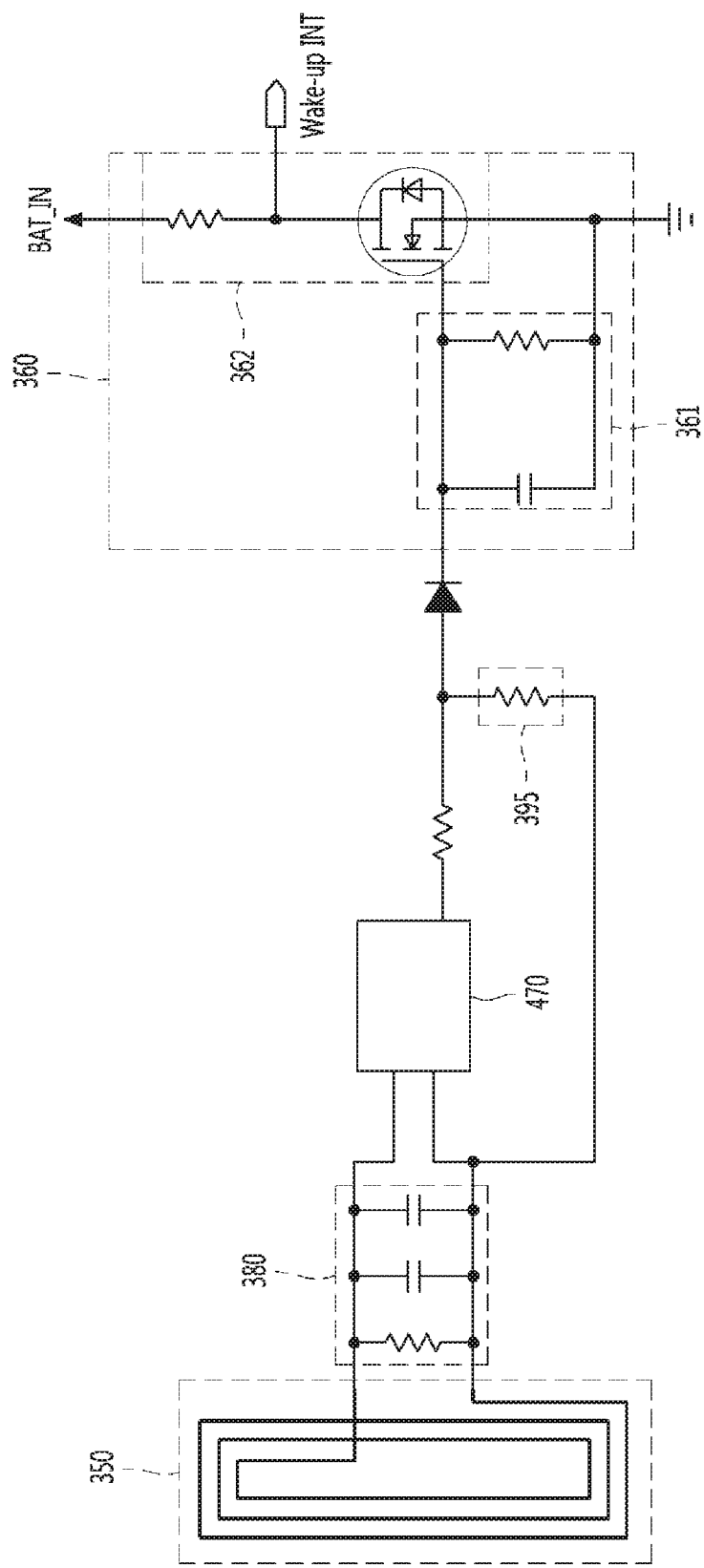
[Fig. 9]

[Fig. 10]
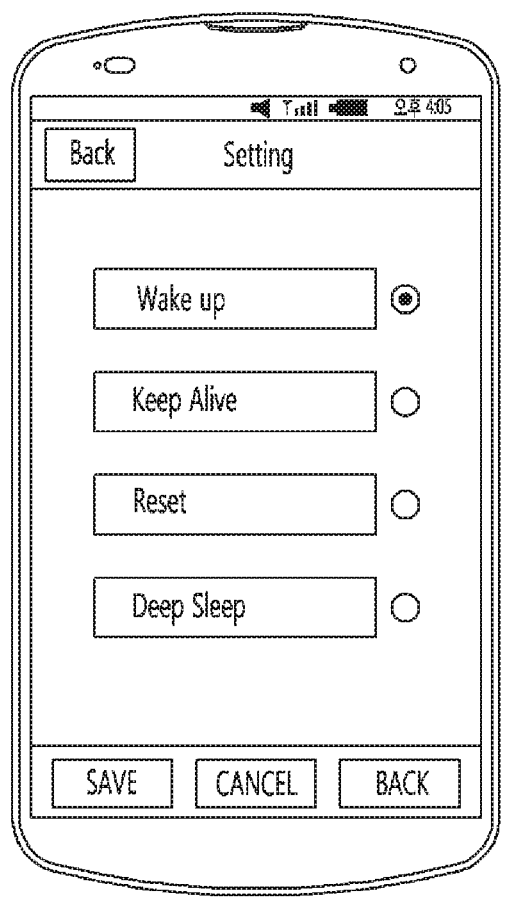
[Fig. 11]
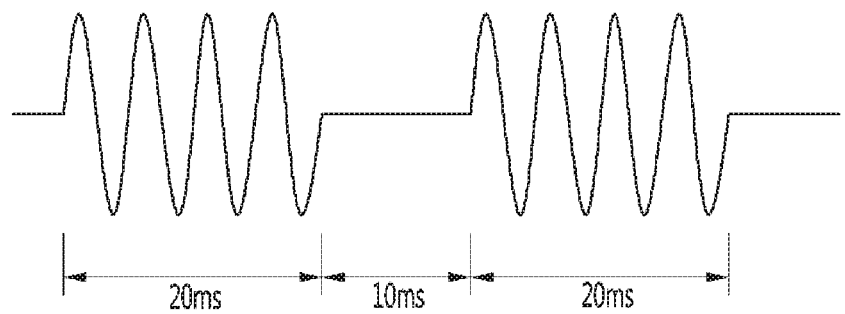

[Fig. 12]
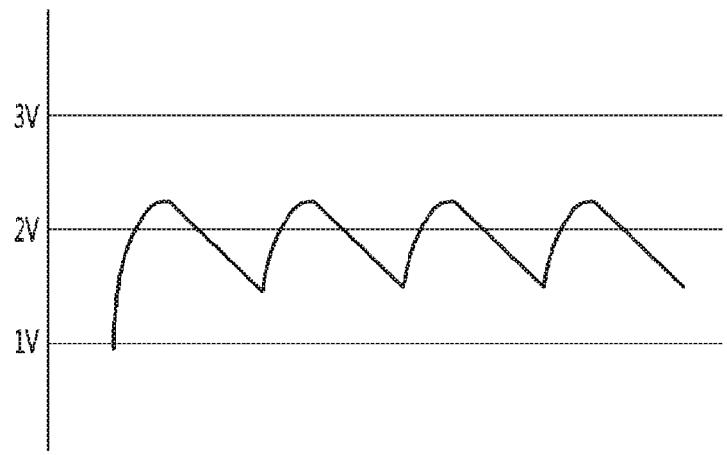
[Fig. 13]
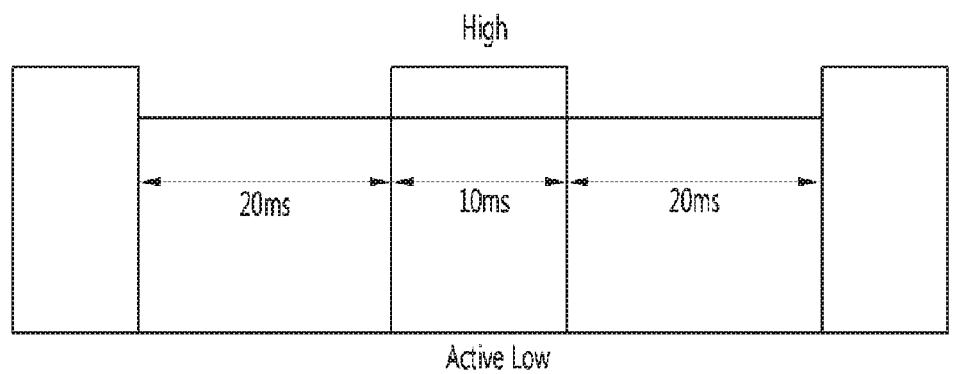

[Fig. 14]
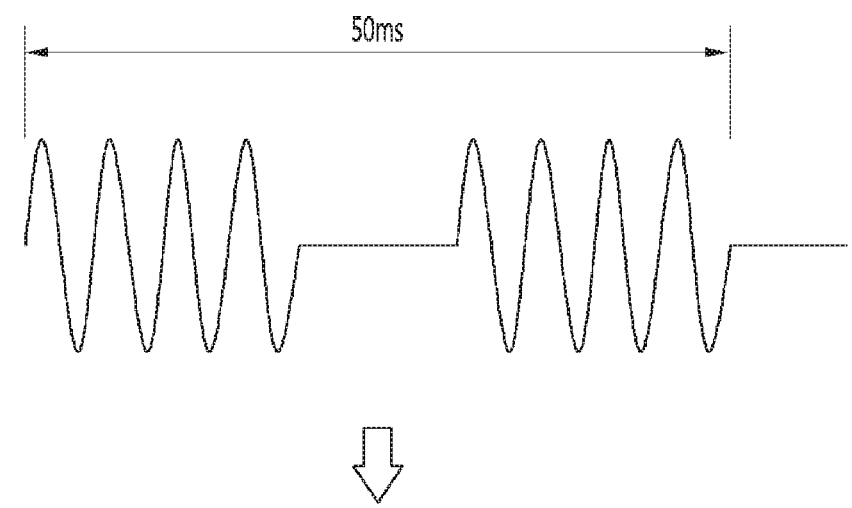
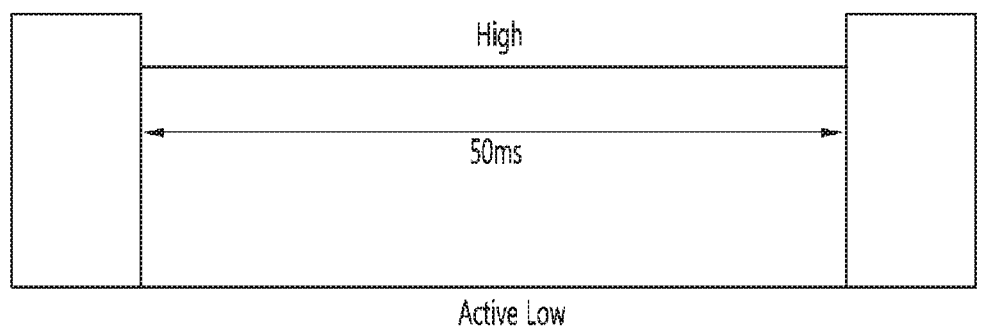

[Fig. 15]
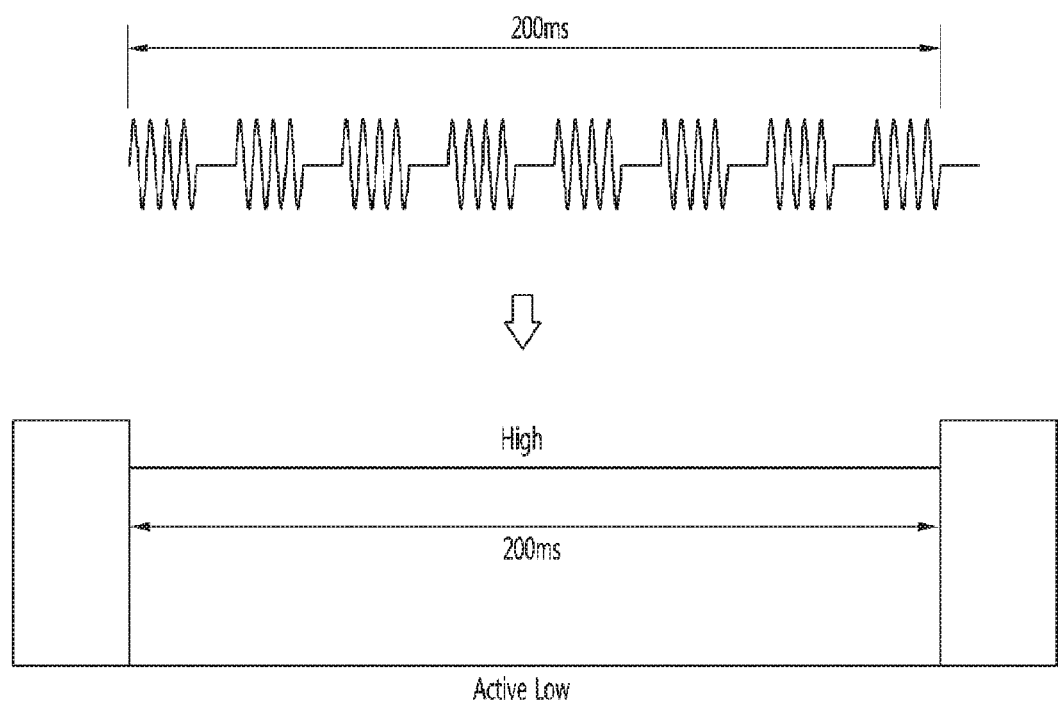

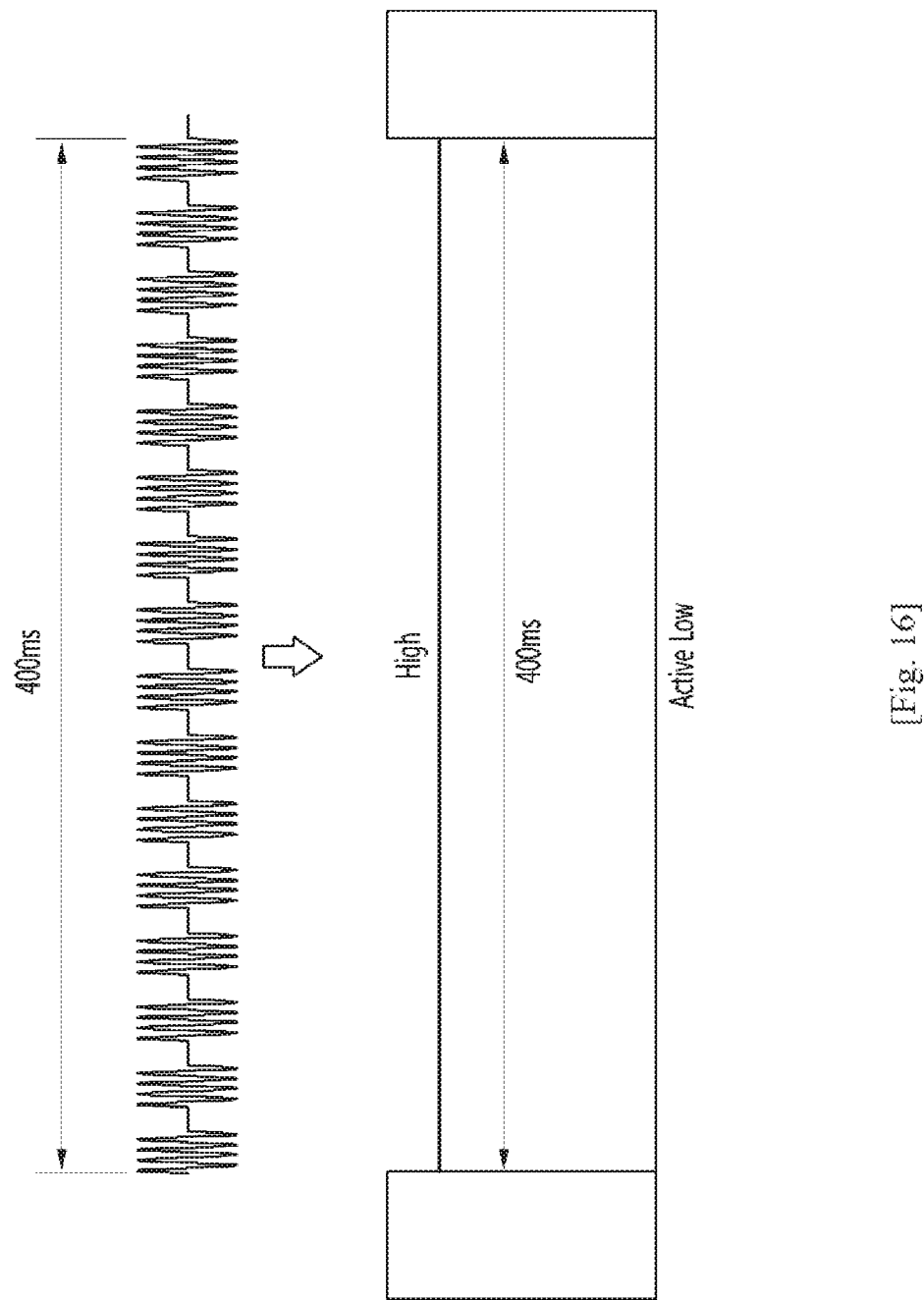

[Fig. 17]
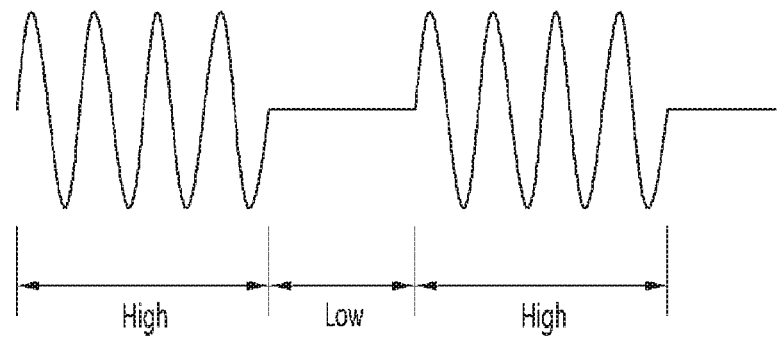
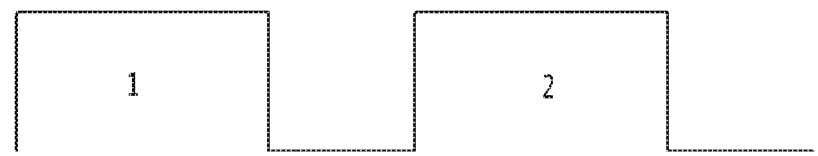
[Fig. 18]
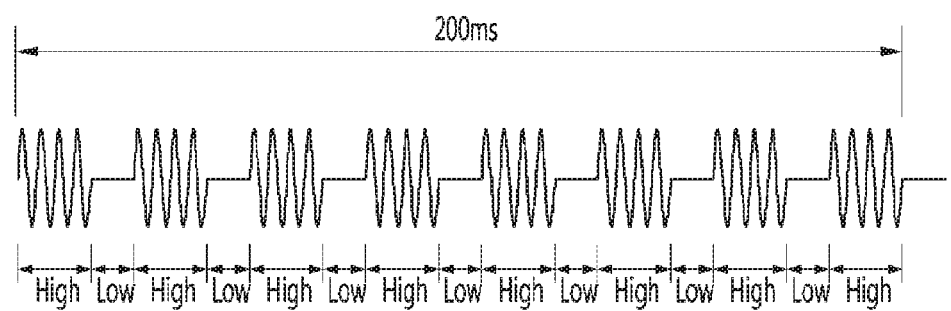

ELECTRONIC SHELF LABEL

CROSS-REFERENCE TO RELATED APPLICATIONS

This application is the U.S. national stage application of International Patent Application No. PCT/KR2015/011706, filed Nov. 3, 2015, which claims priority to Korean Application No. 10-2014-0151593, filed Nov. 3, 2014, the disclosures of each of which are incorporated herein by reference in their entirety.

TECHNICAL FIELD

The present disclosure relates to an electronic shelf label, and more particularly, to an electronic shelf label capable of removing a switch installed in a body and sharing circuits of a device to which a near field wireless communication function is applied and a device to which the near field wireless communication function is not applied.

BACKGROUND ART

Generally, in a distribution store, paper labels which indicate product information, such as a selling price, discount information, a unit price, and a place of origin, of a product displayed on a shelf are used. In a price indicating method using such paper labels, because a paper label in use has to be discarded and a new paper label should be filled in when product information is changed or a product display position is changed, expenses are continuously incurred for maintenance and repair. Further, also in terms of the environmental aspect, because paper, which is a raw material, is wasted, there is a negative influence on environmental protection.

Consequently, as a means for substituting a conventional paper label, research and development on an electronic price indicator (or an electronic shelf label (ESL)) are being vigorously carried out.

An electronic price indicator receives price-related information of a corresponding product from a central control center (server) through a wireless device (e.g., a gateway) and displays the received price-related information to provide information on the corresponding product in real time.

Here, the electronic price indicator displays frequent changes in information, discount information, or the like of the corresponding product and provides user convenience.

Nowadays, displaying numerous pieces of information such as a store symbol, a promotion image, a barcode, a product name, a product image and place-of-origin information as well as price information is required.

The electronic price indicating system includes a server, a gateway, and a plurality of electronic price indicators.

Here, the gateway and the server are connected by a wired system, the gateway and the plurality of electronic price indicators are wirelessly connected, and the gateway and the electronic price indicator performs one-way communication or two-way communication depending on types of the electronic price indicators.

Meanwhile, the electronic price indicators are a battery type and are configured to consume very low power by electronic paper displays and the like and have a service life of about 1 to 5 years.

After wirelessly receiving price information and the like through a gateway in charge, the electronic price indicators enter an ultra power mode of a deep sleep state for saving a service life of the battery.

Here, the electronic price indicators wake up at a predetermined interval (e.g., a 5-to-30-minute interval) and check through the gateway in charge whether new price information is present. Accordingly, when new price information is present, the electronic price indicators check and reflect the price changes.

Meanwhile, in addition to waking up according to a predetermined interval, the electronic price indicators are able to perform a procedure such as reflecting additional price information, registration, and initialization by a manager who manages a product display stand.

FIG. 1 illustrates a structure of an electronic price indicator according to the related art.

Referring to FIG. 1, an electronic price indicator includes a body 10 forming an exterior, a display part 20 configured to display product information such as price information, and a switch button 30 protruding from a side surface of the body 10.

As above, the switch button 30 exposed to the outside is formed at the electronic price indicator. A manager uses the switch button 30 to manage the electronic price indicator.

Here, management of the electronic price indicator includes a wake-up, a keeping-alive, a reset for initialization, an initial screen display, a deep sleep state for entering an ultra power mode, etc. of the electronic price indicator.

The manager pushes the switch button 30 for a corresponding amount of time depending on a desired management mode and generates a corresponding event signal in the electronic price indicator.

The generated event signal may be as follows.

When the switch button is pushed for 1.5 seconds or less, the generated event signal may be a signal that calls for keeping alive after waking up.

When the switch button is pushed for an amount of time in a range of 1.5 seconds to 1.7 seconds, the generated event signal may be a signal that calls for displaying an initial screen.

Also, when the switch button is pushed for 7 seconds or more, the generated event signal may be a signal that calls for entering a deep sleep state.

As above, in the conventional electronic price indicator, the switch button is required at an outer portion of a main body to apply manager scenarios for waking up, initialization, registration, and the like.

However, the outside switch button as above has issues of increasing a price of an electronic price indicator formed to have a small size, degrading assembling performance, and losing an internal circuit configuration.

Particularly, the electronic price indicator as above is installed at a product display stand in a mart or a department store, and the switch button is frequently touched by customers due to curiosity. Accordingly, problems of the electronic price indicator such as an erroneous operation or excessive battery consumption thereof continuously occur.

Meanwhile, the electronic price indicator as above is differentiated into a first type in which a near field communication function is embedded and a second type in which the near field communication function is not embedded.

Accordingly, an electronic price indicator manufacturer manufactures each of the first type circuit board and the second type circuit board and uses a type of a circuit board desired by a client to manufacture an electronic price indicator.

However, an electronic price indicator is designed and manufactured in different forms depending on a type of the electronic price indicator as above, and this acts as a cause of decreasing productivity.

DISCLOSURE

Technical Problem

According to an embodiment, there is provided an electronic price indicator from which an outside switch button, which causes numerous problems due to being frequently touched by customers, is removed.

Further, according to an embodiment, there is provided an electronic price indicator to which a low frequency (LF) circuit is applied so that various manager mode scenarios can be implemented in addition to a function provided by a conventional outside switch.

Further, according to an embodiment, there is provided an electronic price indicator capable of sharing a circuit board of a type in which a near field communication function is embedded and a circuit board of a type in which the near field communication function is not embedded.

Technical problems to be solved by the embodiments proposed herein are not limited to those mentioned above, and other unmentioned technical aspects should be clearly understood by one of ordinary skill in the art to which the embodiments proposed herein pertain from the description below.

Technical Solution

According to an embodiment, an electronic price indicator includes a base substrate; a first mounting part formed on the base substrate and having a first antenna, which is configured to receive product-related information from a server, mounted thereon; a second mounting part formed on the base substrate and having a first communication module connected to the first antenna mounted thereon; a third mounting part formed on the base substrate and having a second antenna, which is configured to receive a management signal from a management server, mounted thereon; a fourth mounting part formed on the base substrate and having a second communication module connected to the second antenna selectively mounted thereon; and a fifth mounting part formed on the base substrate, directly connected selectively to any one of the second antenna and the second communication module, and having a low frequency (LF) circuit, which is configured to transmit an interrupt according to the management signal to the first communication module, mounted thereon.

The fourth mounting part may be disposed at an outer boundary region of an upper surface of the base substrate, and the first mounting part may be disposed at a region which is spaced a predetermined distance apart from the fourth mounting part of an inner region of the outer boundary region.

The second antenna may receive a signal which satisfies both of a near field communication frequency band and an LF communication frequency band.

The second communication module may be selectively mounted on the fourth mounting part depending on a type of the electronic price indicator, and the LF circuit mounted on the fifth mounting part may receive the management signal from the second communication module as the second communication module is mounted on the fourth mounting part and receive the management signal from the second antenna as the second communication module is not mounted on the fourth mounting part.

The electronic price indicator may further include a sixth mounting part configured to connect the third mounting part and the fifth mounting part to each other and having a selector, which is configured to determine a path of the management signal received through the second antenna, mounted thereon.

The selector may be selectively mounted on the sixth mounting part depending on whether the second communication module is mounted on the fourth mounting part.

When the electronic price indicator is of a first type, the second communication module may be mounted on the fourth mounting part, and the sixth mounting part may be formed as an empty space. When the electronic price indicator is of a second type, the fourth mounting part may be formed as an empty space, and the selector may be mounted on the sixth mounting part.

The fifth mounting part may include a smoothing circuit mounting part having a smoothing circuit, which is configured to smooth the management signal, mounted thereon, and an inverter circuit mounting part having an inverter circuit, which is configured to output an interrupt to the first communication module by using the smoothed management signal, mounted thereon.

When the electronic price indicator is of the first type, the smoothing circuit mounting part may be formed as an empty space, and the inverter circuit may be mounted on the inverter circuit mounting part. When the electronic price indicator is of the second type, the smoothing circuit and the inverter circuit may be respectively mounted on the smoothing circuit mounting part and the inverter circuit mounting part.

The electronic price indicator may further include a connector mounting region formed on the base substrate and having a connector for connecting with a display device configured to display the received product-related information mounted thereon.

According to an embodiment, an electronic price indicator includes a first antenna for communication with a server; a first communication module connected to the first antenna and configured to receive product-related information through communication with the server; a display part configured to display the product-related information received through the first communication module; a second antenna configured to receive a management signal through communication with a manager terminal; and a low frequency (LF) circuit part connected to the second antenna and configured to generate an interrupt for controlling operation of the first communication module on the basis of the management signal received through the second antenna.

The second antenna may receive a signal which satisfies both of a near field communication frequency band and an LF communication frequency band.

The management signal may be a frequency-form waveform according to a near field communication (NFC) protocol. The LF circuit part may include a smoothing circuit configured to receive the waveform and smooth the waveform, and an inverter circuit configured to generate an interrupt having a low active waveform by using the smoothed waveform.

The waveform may include a first section in which a signal is present and a second section which is empty. The smoothing circuit may smooth the waveform so that signals in the first section and the second section are both recognized as high. The inverter circuit may generate an interrupt of a high signal corresponding to a length of the waveform received through the second antenna. The first communication module may determine an operation mode on the basis of a length of the interrupt generated by the inverter circuit.

The waveform may include a first section in which a signal is present and a second section which is empty. The smoothing circuit may smooth the waveform so that the first section is recognized as high and the second section is recognized as low. The inverter circuit may generate an interrupt in which a high signal and a low signal are mixed on the basis of the smoothed waveform. The first communication module may determine an operation mode on the basis of the number of high signals in the interrupt generated by the inverter circuit.

The operation module may include one or more of a wake-up mode, a reset mode, a keeping-alive mode, and a deep sleep mode, and the waveform may have different lengths depending on the operation mode.

The electronic price indicator may further include a selector disposed between the LF circuit part and the second antenna and configured to determine a path of the management signal received through the second antenna.

According to an embodiment, an electronic price indicator includes a first antenna for communication with a server; a first communication module connected to the first antenna and configured to receive product-related information through communication with the server; a display part configured to display the product-related information received through the first communication module; a second antenna configured to perform communication with a manager terminal; a second communication module connected to the second antenna and configured to receive one or more of a management signal and additional information data through communication with the manager terminal; and a low frequency (LF) circuit part connected to the second communication module and configured to generate an interrupt for controlling operation of the first communication module on the basis of the management signal received through the second communication module.

The second antenna may receive a signal which satisfies both of a near field communication frequency band and an LF communication frequency band.

The management signal may be a frequency-form waveform according to a near field communication (NFC) protocol. When a waveform corresponding to the management signal is received, the second communication module may smooth and output the received waveform. The LF circuit part may include an inverter circuit configured to generate an interrupt having a low active waveform by using the waveform smoothed by the second communication module.

The waveform may include a first section in which a signal is present and a second section which is empty. The second communication module may smooth the waveform so that signals in the first section and the second section are both recognized as high. The LF circuit part may generate an interrupt of a high signal corresponding to a length of the waveform received through the second antenna. The first communication module may determine an operation mode on the basis of a length of the interrupt generated by the inverter circuit.

The waveform may include a first section in which a signal is present and a second section which is empty. The second communication module may smooth the waveform so that the first section is recognized as high and the second section is recognized as low. The LF circuit part may generate an interrupt in which a high signal and a low signal are mixed on the basis of the smoothed waveform. The first communication module may determine an operation mode on the basis of the number of high signals in the interrupt generated by the inverter circuit.

The operation module may include one or more of a wake-up mode, a reset mode, a keeping-alive mode, and a deep sleep mode, and the waveform may have different lengths depending on the operation mode.

The electronic price indicator may further include a leakage current breaking part disposed between a battery and the second communication module and configured to selectively cut off power supplied to the second communication module.

Advantageous Effects

According to an embodiment, by removing an outside switch circuit which causes an issue, an overall price of an electronic price indicator can be reduced, and the outer appearance of a product can be improved.

Further, according to an embodiment, by a low frequency (LF) circuit using a frequency of about 13.56 MHz which is commonly used in near field communication (NFC), a loop antenna of the NFC can be commonly used, and sharing and miniaturizing a circuit can be achieved.

Further, according to an embodiment, by sharing a circuit board of a type in which a near field communication function is embedded and a circuit board of a type in which the near field communication function is not embedded, productivity of a product can be improved.

DESCRIPTION OF DRAWINGS

FIG. 1 illustrates a structure of an electronic price indicator according to the related art.

FIG. 2 is a schematic block diagram of an electronic price indicating system according to an embodiment of the present disclosure.

FIG. 3 is a block diagram of an electronic price indicator according to a first embodiment of the present disclosure.

FIG. 4 is a block diagram of an electronic price indicator according to a second embodiment of the present disclosure.

FIG. 5 illustrates a shared circuit board according to an embodiment of the present disclosure.

FIG. 6 is a circuit diagram of a low frequency (LF) circuit part (360) according to the first embodiment of the present disclosure.

FIG. 7 is a circuit diagram of the LF circuit part (360) according to the second embodiment of the present disclosure.

FIG. 8 is a circuit diagram of an electronic price indicator (300) of a first type according to an embodiment of the present disclosure.

FIG. 9 is a circuit diagram of the electronic price indicator (300) of a second type according to an embodiment of the present disclosure.

FIG. 10 illustrates a user interface provided for entering the management mode according to an embodiment of the present disclosure.

FIGS. 11 to 13 are views for describing a waveform input into the electronic price indicator (300) according to an embodiment of the present disclosure.

FIGS. 14 to 16 are views for describing an interrupt according to the first embodiment of the present disclosure.

FIGS. 17 and 18 are views for describing an interrupt according to the second embodiment of the present disclosure.

MODES OF THE INVENTION

Advantages, features, and methods of achieving the same of the present disclosure will become clear upon referring to embodiments described below in detail with reference to the accompanying drawings. However, the present disclosure is not limited to the embodiments disclosed below and may be implemented in various other forms. The embodiments are merely provided to make the disclosure of the present disclosure complete and completely inform one of ordinary skill in the art to which the present disclosure pertains of the scope of the present disclosure. The present disclosure is defined only by the scope of the claims below. Like reference numerals refer to like elements throughout.

In describing embodiments of the present disclosure, when detailed description of a known function or configuration is deemed to unnecessarily blur the gist of the present disclosure, the detailed description will be omitted. Terms described below are terms defined in consideration of functions in the embodiments of the present disclosure and may vary depending on the intention of a user or operator or a practice. Therefore, such terms should be defined on the basis of the entire contents disclosed herein.

Combinations of blocks and steps of flowcharts in the accompanying drawings can be performed by computer program instructions. Such computer program instructions can be embedded in a processor of a general-purpose computer, a special-purpose computer, or other programmable data processing equipment. Therefore, the instructions performed by the processor of other programmable data processing equipment generate means for performing functions described in each of the blocks or each of the steps in the flowcharts in the drawings. Because the computer program instructions can also be saved in a computer-usable or computer-readable memory capable of supporting a computer or other programmable data processing equipment to implement a function in a specific way, the instructions stored in the computer-usable or computer-readable memory can also produce a manufacturing item which incorporates an instruction means performing a function described in each of the blocks or each of the steps of the flowcharts in the drawings. Because the computer program instructions can also be embedded in a computer or other programmable data processing equipment, the instructions performed in a computer or other programmable data processing equipment by a process executed in a computer being generated by a series of operation steps being performed in the computer or other programmable data processing equipment can also provide steps for executing functions described in each of the blocks and each of the steps of the flowcharts in the drawings.

Each of the blocks or each of the steps may represent a module, a segment, or a part of a code including one or more executable instructions for executing a specified logical function(s). Also, it should be noted that functions mentioned in the blocks or steps can also be performed in a different order in a few alternative embodiments. For example, two blocks or steps which are consecutively illustrated can substantially be performed simultaneously, or the blocks or steps can also be performed in a reverse order sometimes according to corresponding functions.

FIG. 2 is a schematic block diagram of an electronic price indicating system according to an embodiment of the present disclosure.

Referring to FIG. 2, an electronic price indicating system includes a server 100, a gateway 200, and an electronic price indicator 300.

The server 100 may be implemented as a database server configured to store and manage product information on products displayed in a location such as a distribution store.

The server 100 may store various information required in managing a distribution store in addition to product information.

The server 100 may write and manage command messages for performing various functions such as synchronizing, updating, and changing product information displayed on the electronic price indicator 300.

For this, the server 100 may include a database related to the electronic price indicator 300 and product information displayed thereon.

That is, the server 100 may include a database in which identification information of the electronic price indicator 300 and product information displayed on the electronic price indicator 300 are stored by being interconnected.

In other words, the electronic price indicator 300 is provided in plurality to respectively display pieces of information on a plurality of products. Here, the plurality of electronic price indicators 300 each contain identification information to be differentiated from other electronic price indicators 300.

Consequently, the electronic price indicators 300 may include a database in which identification information of each of the plurality of electronic price indicators 300 and product information displayed on each of the electronic price indicators 300 are stored by being interconnected.

The gateway 200 performs communication with the server 100, and accordingly, transmits product information transmitted from the server 100 to a corresponding electronic price indicator 300.

For this, the gateway 200 is preferably provided in plurality.

Here, a network interface is configured between the server 100 and the gateway 200.

The network interface may perform a function of forming a communication channel between the server 100 and the gateway 200 so that a command message generated in the server 100 (e.g., a product information update message, a product information change message, a management information acquisition message) is transmitted to the gateway 200 in real time. That is, for example, the network interface may configure a message generated in the server 100 as a packet appropriate for a preset communication method used in communication with the gateway 200 and perform a function of transmitting the message. Also, by receiving a receipt confirmation message transmitted from the gateway 200 in the preset communication method, converting the message into a message receivable by the server 100, and transmitting the message, the network interface may allow succeeding operations to be performed.

The gateway 200 serves to analyze data received from the server 100, check whether a message or data to be transmitted to the electronic price indicator 300 communicating with itself is present, and when the message or data to be transmitted is checked as being present, transmit the checked message or data to the corresponding electronic price indicator 300.

The gateway 200 may configure a message to be transmitted to the electronic price indicator 300 as a packet according to a preset communication method and transmit the configured packet to the corresponding electronic price indicator 300.

Also, the gateway 200 may receive a receipt confirmation message transmitted from the electronic price indicator 300 and transmit the received receipt confirmation message to the server 100.

The Zigbee wireless communication method (i.e., IEEE 802.15.4) may be applied to the gateway 200 and the electronic price indicator 300 so that a single gateway is able to communicate with a plurality of electronic price indicators 300. Also, wireless communication methods such as wireless fidelity (Wi-Fi, i.e., IEEE 802.11) and Bluetooth (i.e., IEEE 802.15.1) can be applied to the gateway 200 and the electronic price indicator 300 so that data is transmitted and received at high speed.

The electronic price indicator 300 receives data related to product information transmitted from the gateway 200 and displays the received data on a display.

Also, the electronic price indicator 300 transmits an operation result according to receiving the data related to the product information transmitted from the gateway 200 to the gateway 200.

Here, the plurality of electronic price indicators 300 may communicate with a single gateway 200. As described above, the Zigbee wireless communication method can be applied so that communication between the single gateway 200 and the plurality of electronic price indicators 300 is possible. To more efficiently implement this, communication operation in which communication between the gateway 200 and the electronic price indicators 300 is divided into a plurality of communication channels depending on a type of data may be performed.

Each of the plurality of electronic price indicators 300 receives a wake-up signal transmitted from a separate external device without receiving a wake-up signal from the server 100. Here, the separate external device may be a terminal owned by a manager.

The terminal may include a mobile phone, a smartphone, a laptop computer, a digital broadcasting terminal, a personal digital assistant (PDA), a portable multimedia player (PMP), and a navigation device.

That is, the electronic price indicator 300 is disposed in an environment in which regular power supply from outside is difficult. Accordingly, the electronic price indicator 300 is operated by power supplied from a battery configured therein.

Consequently, for the electronic price indicator 300 to be used for a long period of several years or more with one-time battery change, minimizing power consumption is important.

For this, the electronic price indicator 300 is managed using a wake-up method.

A general electronic price indicator 300 wakes up at a preset time interval to check whether data to be received by itself is present. However, the electronic price indicator 300 according to an embodiment wakes up by an external interrupt to check whether data to be received by itself is present. Here, the external interrupt is generated by a signal supplied from a separate terminal instead of a switch button configured at an outer portion of a main body of the electronic price indicator 300. This will be described in more detail below.

Meanwhile, when the electronic price indicator 300 wakes up as above and checks whether data to be received by itself is present and it is checked that there is no data to be received, the electronic price indicator 300 is operated in a deep sleep mode to minimize power consumption until next external interrupt is generated.

That is, the electronic price indicator 300 may allow data to be received and processed by supplying power to a predetermined function part only when data to be received is checked to be present.

Here, the deep sleep mode refers to a state in which required power is supplied to only some elements of the electronic price indicator 300 required in checking whether data to be received is present. Also, a normal mode refers to a state in which sufficient power for operating elements of the electronic price indicator 300 is supplied.

Meanwhile, the electronic price indicator 300 may be differentiated into a first type and a second type, and detailed inner configuration blocks may be changed depending on the differentiated first type and second type.

However, a board on which detailed configuration circuits of the electronic price indicator 300 of the first type and the electronic price indicator 300 of the second type are mounted is commonly used.

Here, differentiation between the first type and the second type may be determined by a customer's request. That is, depending on a purpose of the electronic price indicator 300, customers desire the electronic price indicator 300 in which a near field communication (NFC) function is embedded or, unlike this, desire the electronic price indicator 300 in which the NFC function is not embedded.

Accordingly, a manufacturer of the electronic price indicator 300 has separately manufactured the electronic price indicator 300 of the first type in which the NFC function is embedded and the electronic price indicator 300 of the second type in which NFC function is not embedded.

However, according to an embodiment, by manufacturing the electronic price indicator 300 of the first type in which the NFC function is embedded and the electronic price indicator 300 of the second type in which the NFC function is not embedded using a single shared circuit board, productivity of the electronic price indicator 300 is improved.

Further, according to an embodiment, an outside switch button is not used for a wake-up of the electronic price indicator 300, and the wake-up is performed by a signal generated through a separate terminal.

Here, the electronic price indicator 300 uses a low frequency (LF) circuit to recognize a wake-up signal transmitted from the external terminal. Here, the wake-up signal has a waveform of a predetermined frequency. Here, the LF circuit may recognize various management signals as well as the wake-up signal depending on a frequency of a waveform transmitted from the external terminal.

That is, according to an embodiment, the electronic price indicator 300 may be changed to various management modes such as a wake-up mode, a keeping-alive mode, and a reset mode according to a change in a frequency of the waveform.

Here, the LF circuit commonly uses an antenna in a frequency band used in the NFC to receive a signal of a waveform having a specific frequency.

Accordingly, by the LF circuit, the electronic price indicator 300 according to the embodiment does not require a separate antenna for receiving a signal of a waveform having the specific frequency. In this way, cost can be saved.

Hereinafter, the electronic price indicator 300 will be described in more detail.

FIG. 3 is a block diagram of an electronic price indicator according to a first embodiment of the present disclosure, and FIG. 4 is a block diagram of an electronic price indicator according to a second embodiment of the present disclosure.

Here, the electronic price indicator 300 according to the first embodiment illustrated in FIG. 3 refers to the above-described electronic price indicator 300 of the first type in which the NFC function is embedded, and the electronic price indicator 300 according to the second embodiment illustrated in FIG. 4 refers to the above-described electronic price indicator 300 of the second type in which the NFC function is not embedded.

Here, the electronic price indicator 300 illustrated in FIG. 3 and the electronic price indicator 300 illustrated in FIG. 4 are differentiated by whether a second communication module (specifically, an NFC chip) for providing the NFC function is included.

That is, the electronic price indicator 300 according to the first embodiment illustrated in FIG. 3 includes the second communication module, and unlike this, the electronic price indicator 300 according to the second embodiment does not include the second communication module.

In other words, the electronic price indicator 300 of the first type and the electronic price indicator 300 of the second type may be differentiated from each other according to whether the second communication module is mounted.

Referring to FIGS. 3 and 4, the electronic price indicators 300 of the first type and the second type commonly include a battery 310, a first antenna 320, a first communication module 330, a display part 340, a second antenna 350, and an LF circuit part 360, and a second communication module 370 is further included only in the electronic price indicator of the first type.

Consequently, in the electronic price indicator 300 of the first type, the LF circuit part 360 is not directly connected to the second antenna 350, and the second communication module 370 is further disposed therebetween.

Meanwhile, in the electronic price indicator 300 of the second type, the second communication module 370 is not configured between the LF circuit part 360 and the second antenna 350, and accordingly, the LF circuit part 360 is directly connected to the second antenna 350.

The battery 310 supplies driving power to each of the elements of the electronic price indicator 300.

The battery 310 may supply driving power only to particular elements of the elements according to a driving mode of the electronic price indicator 300 or, unlike this, supply driving power to all of the elements.

The first antenna 320 performs communication with the gateway 200 to receive data transmitted from the server 100. That is, the first antenna 320 receives information on product information from the gateway 200 and transmits the received information to the first communication module 330.

Also, the first antenna 320 transmits a message related to an operation result according to receiving the data transmitted from the first communication module 330 to the gateway 200.

The first antenna 320 is preferably an antenna in the 2.4 GHz band.

The first communication module 330 performs communication with the gateway 200 to receive information transmitted from the server 100 and control the electronic price indicator 300 on the basis of the received information.

That is, when product-related information such as price information is received through the gateway 200, the first communication module 330 transmits the received product-related information to the display part 340 and makes the product-related information to be displayed on the display part 340.

Also, the first communication module 330 may control an overall operation of the electronic price indicator 300.

The display part 340 displays the product-related information transmitted through the first communication module 330. Here, the display part 340 may be implemented with electronic paper (E-paper).

Meanwhile, the product-related information displayed on the display part 340 may include various information such as a store symbol, a promotion image, a barcode, a product name, a product image, place-of-origin information, a product price, and discount information.

The second antenna 350 receives a signal transmitted from an external manager terminal or a customer terminal.

Here, when the electronic price indicator 300 is the first type, the second antenna 350 may receive various data (e.g., video data related to a product and event data) as well as a signal for managing the electronic price indicator 300. This is because the second communication module 370 which provides the NFC function is disposed at an output end of the second antenna 350. Consequently, the second antenna 350 may receive various additional information data as well as a waveform of a specific frequency for managing the electronic price indicator 300.

Here, the waveform is a signal of an NFC protocol.

Meanwhile, when the electronic price indicator 300 is the second type, the NFC function is not embedded in the electronic price indicator 300. In other words, the second communication module 370 is not mounted on the electronic price indicator 300, and accordingly, the LF circuit part 360 is directly connected to the output end of the second antenna 350.

Consequently, the second antenna 350 receives only a waveform having a predetermined frequency of the NFC protocol for managing the electronic price indicator 300.

Here, the second antenna 350 transmits a signal to the second communication module 370 in the first type and transmits a signal to the LF circuit part 360 in the second type.

Accordingly, the second antenna 350 should have an NFC frequency band and an LF frequency band at the same time.

Consequently, the second antenna 350 is preferably an antenna in the 13.56 MHz band which is a common frequency band between NFC and LF.

Because of this, the second antenna 350 may receive various additional information data as well as a waveform of a particular frequency for the management and output to the second communication module 370 in the first type, and receive a waveform of a particular frequency for the management and output to the LF circuit part 360 in the second type.

The LF circuit part 360 uses the waveform received through the second antenna 350 to generate an interrupt for a management mode scenario of the electronic price indicator 300.

Here, the LF circuit part 360 has different circuit configurations according to the type. That is, the received waveform has a specific signal interval during a preset communication time. In other words, a waveform received through the second antenna 350 has a frequency form instead of a direct current form, and periodical empty spaces are present at a specific signal interval.

Consequently, a circuit for smoothing the waveform is required to generate an interrupt such as a wake-up of the first communication module 330 by using the above waveform.

Here, in the case of the first type, the second communication module 370 is mounted, and the second communication module 370 may smooth a waveform received through an interrupt pin and output a stable direct current high value.

Accordingly, the LF circuit part 360 included in the electronic price indicator 300 of the first type does not require a circuit for smoothing the waveform, and accordingly, only includes an inverter circuit configured to output an interrupt having an active low waveform by using the smoothed signal.

However, because the second communication module 370 is not mounted on the electronic price indicator 300 of the second type, the electronic price indicator 300 requires a smoothing circuit for smoothing the received waveform.

Consequently, the LF circuit part 360 included in the electronic price indicator 300 of the second type includes a smoothing circuit configured to smooth the waveform and an inverter circuit configured to output an interrupt having an active low form by using the smoothed signal.

The second communication module 370 is mounted only on the electronic price indicator 300 of the first type, and accordingly, transmits a signal received through the second antenna 350 to the LF circuit part 360 or the first communication module 330.

That is, when a signal received through the second antenna 350 is a frequency-form waveform for the management, the second communication module 370 smooths the waveform and, accordingly, outputs the smoothed signal to the LF circuit part 360 through an interrupt pin.

Also, when a signal received through the second antenna 350 is data having various additional information, the second communication module 370 transmits the data to the first communication module 330.

Accordingly, the second communication module 370 is connected to the LF circuit part 360 through an interrupt pin.

Also, the second communication module 370 is connected to the first communication module 330 through a master-input-slave-out (MISO) pin, a master-out-slave-input (MOSI) pin, a slave selection (SS) pin, and a serial clock (SCLK) pin.

As above, by using one shared circuit board for the electronic price indicator 300 of the first type and the electronic price indicator 300 of the second type, the present disclosure enables productivity to be improved by standardization of an overall process for manufacturing.

Also, by using a single antenna having a common frequency band between NFC and LF as an NFC antenna and an LF antenna, the present disclosure does not require a separate additional antenna, thereby decreasing cost and miniaturizing the size.

FIG. 5 illustrates a shared circuit board according to an embodiment of the present disclosure.

Referring to FIG. 5, a circuit board 400 includes a base substrate 410, a first antenna mounting region 420, a first communication module mounting region 430, a display connector mounting region 440, a second antenna mounting region 450, an LF circuit part mounting region 460, a second communication module mounting region 470, and a type selector mounting region 480.

The base substrate 410 may be a support substrate of the circuit board 400 on which a single circuit pattern forming a signal connection line is formed, but may also refer to an insulating layer region on which one or more circuit patterns of a circuit board having a plurality of laminated structures are formed.

When the base substrate 410 refers to a single insulating layer of the plurality of laminated structures, a plurality of circuit patterns (not illustrated) may be consecutively formed at an upper portion or a lower portion of the base substrate 410.

The base substrate 410 may be a thermosetting or thermoplastic polymer substrate, a ceramic substrate, an organic-inorganic composite material substrate, or a glass fiber-impregnated substrate. The base substrate 410 may include epoxy-based insulating resin such as bismaleimide triazine (BT) and ajinomoto build-up film (ABF) when including polymer resin, or also include polyimide-based resin unlike the above, but is not particularly limited thereto.

Meanwhile, a circuit pattern formed on the base substrate 410, in other words, a signal line connecting elements mounted on the base substrate to each other, can be formed by an additive process which is a normal process for manufacturing a printed circuit board, a subtractive process, a modified semi-additive process (MSAP), and a semi-additive process (SAP). Detailed description thereof will be omitted herein.

The second antenna mounting region 450 is formed by surrounding a boundary region of the base substrate 410. The second antenna 350 is mounted on the second antenna mounting region 450.

Also, in an inner region of the second antenna mounting region 450, the above-described first antenna mounting region 420, first communication module mounting region 430, display connector mounting region 440, LF circuit part mounting region 460, second communication module mounting region 470, and type selector mounting region 480 are disposed.

That is, the first antenna 320 and the second antenna 350 may interfere with each other, and an arrangement for solving this is required.

Consequently, according to an embodiment, to utilize a space of the base substrate, the second antenna mounting region 450 for arranging the second antenna 350 by surrounding an outer boundary region of an upper surface of the base substrate 410 is formed, and, accordingly, the first antenna mounting region 420 is formed at a position spaced a predetermined distance from the second antenna 350 in the inner region of the second antenna mounting region 450.

The first antenna 320 is mounted on the first antenna mounting region 420.

Also, the first communication module mounting region 430 on which the first communication module 330 connected to the first antenna 320 will be mounted is formed at a position adjacent to that of the first antenna mounting region 420 on the upper surface of the base substrate 410.

The first communication module 330 is mounted on the first communication module mounting region 430.

Also, the display connector mounting region 440 connected to the first communication module 330 mounted on the first communication module mounting region 430 is formed at a position adjacent to that of the first communication module mounting region 430 on the upper surface of the base substrate 410.

A display connector (not illustrated) is mounted on the display connector mounting region 440, and accordingly, the display part 340 is connected to the display connector.

Consequently, the display part 340 is connected to the first communication module 330 through the display connector and receives product-related information through the first communication module 330.

The second communication module mounting region 470 connected to the second antenna 350 mounted on the second antenna mounting region 450 is formed on the upper surface of the base substrate 410.

The second communication module 370 is selectively mounted on the second communication module mounting region 470.

That is, when the electronic price indicator 300 of the first type is manufactured, the second communication module 370 is mounted on the second communication module mounting region 470.

However, when the electronic price indicator 300 of the second type is manufactured, the second communication module 370 is not mounted on the second communication module mounting region 470, and accordingly, the second communication module mounting region 470 remains as an empty space.

The LF circuit part mounting region 460 is disposed near the second communication module mounting region 470 on the upper surface of the base substrate 410.

The LF circuit part 360 is mounted on the LF circuit part mounting region 460.

Here, the LF circuit part mounting region 460 is connected to the second communication module mounting region 470 and is also connected to the second antenna mounting region 450 through a device mounted on the type selector mounting region 480.

Meanwhile, the LF circuit part mounting region 460 includes a smoothing circuit mounting region 461 and an inverter circuit mounting region 462.

Also, a smoothing circuit is selectively mounted on the smoothing circuit mounting region 461 depending on a manufacture type, and an inverter circuit is mounted on the inverter circuit mounting region 462.

That is, the inverter circuit is mounted on the inverter circuit mounting region 462 regardless of the manufacture type.

Also, the smoothing circuit is selectively mounted on the smoothing circuit mounting region 461 depending on the manufacture type. That is, when the electronic price indicator 300 of the first type is manufactured, the smoothing circuit is not mounted on the smoothing circuit mounting region 461, and accordingly, the smoothing circuit mounting region 461 remains as an empty space.

Also, when the electronic price indicator 300 of the second type is manufactured, the smoothing circuit is mounted on the smoothing circuit mounting region 461.

Meanwhile, when the electronic price indicator 300 of the second type is manufactured, the second communication module 370 is not mounted on the second communication module mounting region 470. Here, the second antenna mounting region 450 and the LF circuit part mounting region 460 should be directly connected, and accordingly, a signal should be transmitted through a path including the connected line.

Accordingly, the type selector mounting region 480 having one end connected to the second antenna mounting region 450 and the other end connected to the LF circuit part mounting region 460 is formed.

A device configured to determine a path of a signal received through the second antenna 350 is mounted on the type selector mounting region 480.

The device is a 0-ohm resistor.

Consequently, when the electronic price indicator 300 of the first type is manufactured, the device is not mounted on the type selector mounting region 480 so that a signal received through the second antenna 350 is provided through a path including the second communication module 370 mounted on the second communication module mounting region 470.

When the device is not mounted, a line connected through the device is disconnected and accordingly, the signal is transmitted through the path including the second communication module 370 mounted on the second communication module mounting region 470.

Also, when the electronic price indicator 300 of the second type is manufactured, the device is mounted on the type selector mounting region 480 so that a signal received through the second antenna 350 is directly transmitted to the LF circuit part mounting region 460 without passing through the second communication module mounting region 470.

As above, according to an embodiment, a circuit board for manufacturing the electronic price indicator 300 of the first type and the electronic price indicator 300 of the second type is shared. Accordingly, a region in which a specific element is selectively mounted is kept as an empty space.

Hereinafter, the LF circuit part 360 according to an embodiment of the present disclosure will be described.

FIG. 6 is a circuit diagram of the LF circuit part 360 according to the first embodiment of the present disclosure, and FIG. 7 is a circuit diagram of the LF circuit part 360 according to the second embodiment of the present disclosure.

That is, FIG. 6 illustrates the LF circuit part 360 applied to the electronic price indicator 300 of the first type, and FIG. 7 illustrates the LF circuit part 360 applied to the electronic price indicator 300 of the second type.

A difference between the LF circuit part 360 of the first type and the LF circuit part 360 of the second type is determined by whether a smoothing circuit 361 is present.

That is, the LF circuit part 360 of the first type does not include the smoothing circuit 361, and the LF circuit part 360 of the second type includes the smoothing circuit 361.

Accordingly, hereinafter, only the LF circuit part 360 illustrated in FIG. 7 will be described.

The LF circuit part 360 includes the smoothing circuit 361 configured to smooth a frequency-form waveform received through the second antenna 350 and an inverter circuit 362 configured to generate an interrupt having an active low waveform by using a signal smoothed by the smoothing circuit 361.

Here, the LF circuit part 360 of the first type includes only the inverter circuit 362, and accordingly, the function performed by the smoothing circuit 361 is performed by the second communication module 370.

Meanwhile, a first diode D1 is disposed at a front end of the smoothing circuit 361.

The smoothing circuit 361 includes a first inductor L1, a first capacitor C1, and a first resistor R1.

The first inductor L1 has one end connected to an output end of the first diode D1.

The first capacitor C1 has one end connected to the output end of the first diode D1 and the one end of the first inductor L1.

The first resistor R1 has one end connected to the other end of the first inductor L1 and the other end connected to the other end of the first capacitor C1.

Because a waveform introduced through the second antenna 350 has a frequency form instead of a direct current form, the smoothing circuit 361 configured as above converts the frequency-form waveform into a direct current interrupt waveform.

Here, the interrupt wave form can be formed by adjusting an LC time constant of the smoothing circuit 361.

The input waveform includes a plurality of signal regions in which a signal is present and an empty section disposed between the plurality of signal regions.

Accordingly, in the first embodiment, the LC time constant may be adjusted to be equal to or higher than 0.75 V which is a minimum voltage in which all of the plurality of signal regions and the empty section can be recognized as high.

Unlike the above, in the second embodiment, the LC time constant can be adjusted so that the plurality of signal regions are recognized as high and the empty section is recognized as low.

The waveform smoothed by the smoothing circuit 361 is input into the inverter circuit 362. More clearly, the inverter circuit 362 includes a first switching device Q1 and a second resistor R2, and the smoothed waveform is input into a gate of the first switching device Q1 to enable the first switching device Q1 to be turned on.

The first switching device Q1 has a gate connected to an output end of the smoothing circuit 361, a source grounded, and a drain connected to one end of the second resistor.

The second resistor R2 has one end connected to the drain of the first switching device Q1 and the other end connected to an input end of battery power.

Also, a contact point between the drain of the first switching device Q1 and the one end of the second resistor R2 is connected to an interrupt input port of the first communication module 330.

The inverter circuit 362 configured as above forms a high interrupt signal output through the smoothing circuit 361 into an interrupt having an active low waveform.

FIG. 8 is a circuit diagram of the electronic price indicator 300 of the first type according to an embodiment of the present disclosure, and FIG. 9 is a circuit diagram of the electronic price indicator 300 of the second type according to an embodiment of the present disclosure.

Referring to FIG. 8, the electronic price indicator 300 of the first type includes the second antenna 350, an antenna tuning part 380, the second communication module 370, the LF circuit part 360, and a leakage current breaking part 390.

The second antenna 350 is mounted on the second antenna mounting region 450 of the circuit board 400.

The second communication module 370 is mounted on the second communication module mounting region 470 of the circuit board 400.

The LF circuit part 360 is mounted on the LF circuit part mounting region 460. Preferably, because the second communication module 370 is mounted on the second communication module mounting region 470, the LF circuit part 360 includes only the inverter circuit. Consequently, the LF circuit part 360 includes only the inverter circuit mounted on the inverter circuit mounting region.

The antenna tuning part 380 includes one or more capacitors and a resistor and, accordingly, enables a signal to be received through the second antenna 350.

Meanwhile, because the electronic price indicator 300 is of the first type, the second communication module 370 is mounted on the circuit board. Accordingly, the type selector (i.e., the 0-ohm resistor) is not mounted on the type selector mounting region 480, and the type selector mounting region 480 remains as an empty space.

Meanwhile, in the case of the electronic price indicator 300 including the second communication module 370, because operation of the electronic price indicator 300 should be performed with ultra low power, battery power should be completely cut off when operation of the second communication module 370 is completed.

Consequently, the leakage current breaking part 390 having one end connected to the battery power and the other end connected to the second communication module 370 to cut off power supplied to the second communication module 370 as the operation of the second communication module 370 is completed is disposed.

The leakage current breaking part 390 includes a first switching device Q1, a second switching device Q2, a first resistor R1, a second resistor R2, and a second capacitor C2.

The second switching device Q2 receives a signal related to operation of the second communication module 370 through a gate.

The first switching device Q1 cuts off power supplied from the battery to prevent the power from being transmitted to the second communication module 370 depending on a switching state of the second switching device Q2.

Also, the first switching device Q2 transmits the power supplied from the battery to the second communication module 370 depending on a switching state of the second switching device Q2.

Referring to FIG. 9, the electronic price indicator 300 of the second type includes the second antenna 350, the antenna tuning part 380, the LF circuit part 360, and a type selector 395.

The second antenna 350 is mounted on the second antenna mounting region 450 of the circuit board 400.

Here, because the electronic price indicator 300 is of the second type, the second communication module 370 is not mounted on the second communication module mounting region 470. Consequently, the second communication module mounting region 470 remains as an empty space.

The LF circuit part 360 is mounted on the LF circuit part mounting region 460. Preferably, because the second communication module 370 is not mounted on the second communication module mounting region 470, the LF circuit part 360 includes the smoothing circuit 361 and the inverter circuit 362. Consequently, in the LF circuit part 360, the smoothing circuit and the inverter circuit are respectively mounted on the smoothing circuit mounting region and the inverter circuit mounting region.

The antenna tuning part 380 includes one or more capacitors and a resistor and, accordingly, enables a signal to be received through the second antenna 350.

Meanwhile, the type selector 395 is disposed between the second antenna 350 and the LF circuit part 360.

The type selector 395 enables a frequency-form waveform received through the second antenna 350 to be directly input into a path not including the second communication module mounting region 470, i.e., into the LF circuit part 360.

Hereinafter, a form of a signal to enter a management mode and a method of recognizing the same will be described.

FIG. 10 illustrates a user interface provided for entering the management mode according to an embodiment of the present disclosure.

Referring to FIG. 10, a user interface includes a selection screen for selecting any one management mode from a plurality of management modes. The user interface may be provided through a manager's terminal.

The selection screen includes a first selection menu for a wake-up of the electronic price indicator 300, a second selection menu for a keeping-alive thereof, a third selection menu for a reset thereof, and a fourth selection menu for the electronic price indicator 300 to enter a deep sleep state.

A manager may control an operation of the electronic price indicator 300 by selecting any one desired selection menu through the selection screen provided through the terminal.

FIGS. 11 to 13 are views for describing a waveform input into the electronic price indicator 300 according to an embodiment of the present disclosure.

FIG. 11 illustrates a waveform initially input into the electronic price indicator according to an embodiment of the present disclosure.

Referring to FIG. 11, when any one selection menu is selected through the selection screen, a waveform signal corresponding to the selected menu is transmitted to the electronic price indicator 300.

Then, the electronic price indicator 300 receives the transmitted waveform signal, analyzes the received waveform, and enters an operation mode corresponding to the received waveform.

Here, in the waveform, a plurality of sections in which a signal is present and an empty section between the plurality of sections are present. That is, the waveform has a frequency form in which a plurality of signals are input at a predetermined signal interval during a preset communication time.

As illustrated in FIG. 11, the waveform has 50 ms as a communication time and, accordingly, may have a form in which a 20 ms-signal is input at a signal interval of 10 ms.

Here, the communication time of the waveform may be changed according to a management mode to be entered. For example, a waveform for entering the wake-up mode may have 50 ms as the communication time, a waveform for entering the reset mode may have 200 ms as the communication time, and a waveform for entering the deep sleep mode may have 400 ms as the communication time.

The waveform input as above is smoothed by the smoothing circuit included in the electronic price indicator 300.

Here, the waveform may be smoothed by the second communication module 370 or, unlike this, may be smoothed by the smoothing circuit included in the LF circuit part. That is, the waveform is smoothed by the second communication module 370 or the LF circuit part 360 depending on the type of the electronic price indicator 300.

That is, the waveform introduced through the second antenna 350 has a frequency form instead of a direct current form and includes an empty section of about 10 ms.

Accordingly, the waveform should be converted into a direct current form to generate an interrupt in the first communication module 330 with the waveform.

Consequently, the smoothing circuit (the second communication module or the LF circuit part) smooths a first section in which a signal forming the waveform is present and a second section which is empty to enable both of the first section and the second section be recognized as high.

Here, because a minimum voltage for recognizing as high is 0.75 V, the LC time constant of the smoothing circuit is adjusted corresponding to this to enable both of the first section and the second section to be recognized as high.

A signal smoothed by the smoothing circuit is input to the inverter circuit 362 of the LF circuit part 360.

The inverter circuit 362 generates an interrupt having an active low waveform by using the signal smoothed by the smoothing circuit, in other words, a high interrupt signal, and outputs the interrupt.

That is, as illustrated in FIG. 13, the waveform includes a plurality of first sections of 20 ms and a second section of 10 ms. Here, by smoothing, all of the first sections and the second section are recognized as high.

Consequently, the inverter circuit 362 generates an interrupt of an active low form having a time of 50 ms, and the interrupt is input into the first communication module 330.

The first communication module 330 checks an input time of the input interrupt and, on the basis of the checked input time, enters a management mode corresponding thereto.

FIGS. 14 to 16 are views for describing an interrupt according to the first embodiment of the present disclosure.

First, referring to FIG. 14, a first waveform has a length of 50 ms. The first waveform includes two first sections of 20 ms and a second section of 10 ms.

Here, the first waveform is smoothed by the smoothing circuit, and the inverter circuit uses the smoothed first waveform to generate an interrupt having an active low form.

Here, the first waveform is smoothed so that all of the first sections and the second section are recognized as high. Accordingly, the interrupt is a high signal having a length of 50 ms.

Accordingly, the high signal of 50 ms is input into the first communication module 330, and the first communication module 330 enters a management mode corresponding to the high signal of 50 ms.

Referring to FIG. 15, a second waveform has a length of 200 ms. The second waveform includes a plurality of first sections of 20 ms and a plurality of second sections of 10 ms.

Here, the second waveform is smoothed by the smoothing circuit, and the inverter circuit uses the smoothed second waveform to generate an interrupt having an active low form.

Here, the second waveform is smoothed so that all of the first sections and the second sections are recognized as high. Accordingly, the interrupt is a high signal having a length of 200 ms.

Accordingly, the high signal of 200 ms is input into the first communication module 330, and the first communication module 330 enters a management mode corresponding to the high signal of 200 ms.

Referring to FIG. 16, a third waveform has a length of 400 ms. The third waveform includes a plurality of first sections of 20 ms and a plurality of second sections of 10 ms.

Here, the third waveform is smoothed by the smoothing circuit, and the inverter circuit uses the smoothed third waveform to generate an interrupt having an active low form.

Here, the third waveform is smoothed so that all of the first sections and the second sections are recognized as high. Accordingly, the interrupt is a high signal having a length of 400 ms.

Accordingly, the high signal of 400 ms is input into the first communication module 330, and the first communication module 330 enters a management mode corresponding to the high signal of 400 ms.

FIGS. 17 and 18 are views for describing an interrupt according to the second embodiment of the present disclosure.

First, referring to FIG. 17, a first waveform has a length of 50 ms. The first waveform includes two first sections of 20 ms and a second section of 10 ms.

Here, the first waveform is smoothed by the smoothing circuit, and the inverter circuit uses the smoothed first waveform to generate an interrupt having an active low form.

Here, the smoothing circuit may smooth the first waveform so that the first sections are recognized as high and the second section is recognized as low. This can be achieved by adjusting the LC time constant of a circuit forming the smoothing circuit.

Accordingly, the first waveform is smoothed so that the first sections are recognized as high and the second section is recognized as low. Accordingly, the interrupt includes a high section and a low section.

Accordingly, a signal in which the high section and the low section are mixed is input into the first communication module 330. The first communication module 330 checks the number of high sections in the signal and, depending on the checked number of high sections, enters a management mode corresponding thereto.

For example, the first waveform may include two high sections, and the two high sections may be a signal for entering the wake-up mode.

Accordingly, the first communication module 330 may recognize the number of high sections according to the interrupt and enter the wake-up mode depending on the number of high sections.

Also, referring to FIG. 18, a waveform having a length of 200 ms includes eight high sections. Consequently, the first communication module 330 may enter a management mode corresponding to the eight high sections.

According to an embodiment, by removing an outside switch circuit which causes an issue, an overall price of an electronic price indicator can be reduced, and the outer appearance of a product can be improved.

Further, according to an embodiment, by an LF circuit using a frequency of about 13.56 MHz which is commonly used in NFC, a loop antenna of the NFC can be commonly used, and sharing and miniaturizing a circuit can be achieved.

Further, according to an embodiment, by sharing a circuit board of a type in which an NFC function is embedded and a circuit board of a type in which the NFC function is not embedded, productivity of a product can be improved.

Further, although exemplary embodiments of the present disclosure have been illustrated and described above, the present disclosure is not limited to particular embodiments described above. One of ordinary skill in the art to which the present disclosure pertains should be able to modify and embody the present disclosure in various ways without departing from the gist of the present disclosure defined in the claims below, and the modified embodiments should not be understood as being separate from the technical spirit or prospect of the present disclosure.

The invention claimed is:

1. An electronic price indicator comprising:
a first antenna configured to receive a first signal in a first frequency band;
a first communication module connected to the first antenna and configured to receive the first signal;
a display part configured to display price information included in the first signal that is processed by the first communication module;
a second antenna configured to receive a second signal in a second frequency band different from the first frequency band;
an inverter configured to receive the second signal via the second antenna and output an interrupt signal of a pulse waveform having at least two levels based on the received second signal; and
a second communication module selectively configured between the second antenna and the inverter, configured to receive the second signal from the second antenna and to output the second signal to the first communication module or the inverter,
wherein the second communication module comprises a near field communication (NFC) module,
wherein the first communication module receives the interrupt signal output from the inverter and changes an operation mode depending on the received interrupt signal,
wherein the second communication module is configured to output the second signal to the first communication module when the second signal is additional information data, and
wherein the second communication module is configured to output the second signal to the inverter when the second signal is a management signal.

2. The electronic price indicator of claim 1, further comprising a type selector disposed between the second antenna and the inverter and configured to output the second signal to the inverter when the second communication module is not configured between the second antenna and the inverter.

3. The electronic price indicator of claim 2, wherein:
the interrupt signal is a pulse waveform signal corresponding to a first level or a second level;
a voltage level corresponding to the first level is smaller than a voltage level corresponding to the second level;
an input terminal of the inverter is connected to a second end of a resistor having a first end connected to a ground to receive the second signal; and
an output terminal of the inverter outputs an interrupt signal corresponding to the first level when the second signal is received, and outputs an interrupt signal corresponding to the second level when the second signal is not received.

4. The electronic price indicator of claim 2, wherein:
the second signal includes a first section including a valid signal of a waveform in the second frequency band and a second section that is empty; and
the inverter outputs the interrupt signal in which the first section has a high level and the second section has a low level.

5. The electronic price indicator of claim 4, wherein the first communication module receives the interrupt signal, counts the number of signals having a high level within the received interrupt signal, and determines the operation mode to be changed depending on the counted number of high level signals;
the operation mode includes a wake-up mode, a reset mode, a keeping-alive mode, or a deep sleep mode; and
in the management signal, durations and the number of signals having the high level are different for different operation modes.

6. The electronic price indicator of claim 2, further comprising:
an antenna tuning part connected to one end and the other end of the second antenna and including at least one capacitor; and
a second communication module including a first input terminal connected to the one end of the second antenna via the antenna tuning part and a second input terminal connected to the other end of the second antenna via the antenna tuning part,
wherein at least one diode is connected to the second input terminal and transmits the second signal to the inverter.

7. The electronic price indicator of claim 1, wherein the second frequency band is operated at about 13.56 MHz.

8. The electronic price indicator of claim 7, wherein the inverter comprises a smoothing part configured to smooth the second signal when the second communication module is not configured.

9. The electronic price indicator of claim 1, wherein:
the second signal includes a first section including a valid signal of a waveform in the second frequency band and a second section that is empty; and
the inverter outputs a signal of an active low waveform based on the first section and the second section,
the operation mode includes a wake-up mode, a reset mode, a keeping-alive mode, or a deep sleep mode; and in the management signal, durations and number of valid signals are different for different operation modes.

10. The electronic price indicator of claim 9, wherein the second communication module is configured to smooth the second signal when the second signal is the management signal.

11. A method of changing an operation mode of an electronic price indicator including a first antenna configured to receive a first waveform signal in a first frequency band, a second antenna configured to receive a second waveform signal in a second frequency band, and an inverter connected to the second antenna, and a second communication module selectively configured between the second antenna and the inverter, the method comprising:
  receiving the second waveform signal in the second frequency band;
  outputting, by the inverter, an interrupt signal of a pulse waveform having at least two levels based on the received second waveform signal;
  determining an operation mode of the electronic price indicator based on of a duration of the output interrupt signal and/or number of interrupt signals; and
  changing the operation mode based on a result of the determining an operation mode,
  wherein the changing includes waking up a first communication module configured to receive and process the first waveform signal in the first frequency band, which is different from the second frequency band,
  wherein the second communication module comprises a near field communication (NFC) module,
  wherein the first communication module receives the interrupt signal output from the inverter and changes an operation mode depending on the received interrupt signal,
  wherein the second communication module is configured to output the second signal to the first communication module when the second signal is additional information data,
  wherein the second communication module is configured to output the second signal to the inverter when the second signal is a management signal, and
  wherein the second frequency band is operated at about 13.56 MHz.

12. The method of claim 11, wherein:
  the interrupt signal is a pulse waveform signal corresponding to a first level or a second level;
  a voltage level corresponding to the first level is smaller than a voltage level corresponding to the second level;
  a ground voltage or the second waveform signal is applied to the inverter; and
  the inverter outputs an interrupt signal corresponding to the first level when the second waveform signal is applied thereto, and outputs an interrupt signal corresponding to the second level when the second waveform signal is not applied thereto.

13. The method of claim 11, wherein:
  the second waveform signal includes a first section including a valid signal of a waveform in the second frequency band and a second section that is empty; and
  the inverter outputs a signal of an active low waveform based on the first section and the second section.

14. The method of claim 11, wherein:
  the second signal includes a first section including a valid signal of a waveform in the second frequency band and a second section that is empty;
  the inverter outputs the interrupt signal in which the first section has a high level and the second section has a low level;
  the determining of the operation mode includes determining the operation mode to be changed based on the duration of the valid signal and the number of valid signals; and
  the duration and the number of valid signals in the second waveform signal are different for different operation modes.

15. The method of claim 14, wherein:
  the operation mode includes a wake-up mode or a deep sleep mode.

16. The method of claim 11, further comprising smoothing the received second waveform signal.

* * * * *